(12) United States Patent
Lim et al.

(10) Patent No.: US 10,908,739 B2
(45) Date of Patent: Feb. 2, 2021

(54) TABLETOP DISPLAY DEVICE AND DRIVING METHOD THEREFOR

(71) Applicant: SK TELECOM CO., LTD., Seoul (KR)

(72) Inventors: Gukchan Lim, Seoul (KR); Chanmin Yoon, Seoul (KR); Duckmoon Shin, Seoul (KR); Jinsoo Jeon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/313,088

(22) PCT Filed: Apr. 3, 2017

(86) PCT No.: PCT/KR2017/003635
§ 371 (c)(1),
(2) Date: Dec. 24, 2018

(87) PCT Pub. No.: WO2017/222153
PCT Pub. Date: Dec. 28, 2017

(65) Prior Publication Data
US 2019/0317638 A1    Oct. 17, 2019

(30) Foreign Application Priority Data

Jun. 24, 2016 (KR) .......................... 10-2016-0079358

(51) Int. Cl.
*G06F 3/042* (2006.01)
*G06F 3/0488* (2013.01)
*G06F 3/01* (2006.01)

(52) U.S. Cl.
CPC .......... *G06F 3/0421* (2013.01); *G06F 3/0488* (2013.01); *G06F 3/01* (2013.01); *G06F 3/011* (2013.01)

(58) Field of Classification Search
CPC .. G06F 3/0421; G06F 3/0488; G06F 3/04166; G06F 2203/04808; G06F 3/01; G06F 1/3262
USPC ........................................................ 345/175
See application file for complete search history.

(56) References Cited

U.S. PATENT DOCUMENTS

| 8,976,135 | B2* | 3/2015 | Annett ................... | G06F 3/0425 345/173 |
| 2008/0150911 | A1* | 6/2008 | Harrison ................ | G06F 1/1626 345/173 |
| 2011/0014955 | A1* | 1/2011 | Kim ........................ | H04M 1/22 455/566 |

(Continued)

*Primary Examiner* — Jason M Mandeville
(74) *Attorney, Agent, or Firm* — Hauptman Ham, LLP (57) ABSTRACT

A tabletop display device includes a flat panel display for displaying an image, light emitting units arranged along a periphery of the flat panel display to emit light toward an inner side and an outer side of the periphery and light receiving units arranged along the periphery to receive light incident from the inner side and the outer side of the periphery. The tabletop display device further includes a control unit for detecting a user's position based on light emitted from at least one of light emitting units and received from the outer side of the periphery by at least one of the light receiving units and for determining a touch position of the flat panel display based on light emitted from at least one of the light emitting units and received from the inner side of the periphery by at least one of the light receiving units.

11 Claims, 8 Drawing Sheets

(56) References Cited

U.S. PATENT DOCUMENTS

| | | | | |
|---|---|---|---|---|
| 2013/0093708 A1* | 4/2013 | Annett | ................... | G06F 3/041 |
| | | | | 345/173 |
| 2014/0210793 A1* | 7/2014 | Eriksson | ................ | F24C 7/083 |
| | | | | 345/175 |
| 2014/0267166 A1* | 9/2014 | Griffiths | ............... | G06F 3/0421 |
| | | | | 345/175 |
| 2014/0364218 A1* | 12/2014 | Holmgren | ............... | G01S 17/88 |
| | | | | 463/31 |
| 2015/0123947 A1* | 5/2015 | Jubner | .................. | B62D 1/046 |
| | | | | 345/175 |
| 2015/0309664 A1* | 10/2015 | Liao | ...................... | G02B 5/001 |
| | | | | 345/175 |
| 2015/0378463 A1* | 12/2015 | Youn | ...................... | G06F 3/042 |
| | | | | 345/175 |
| 2017/0262134 A1* | 9/2017 | Eriksson | .............. | G06F 3/0416 |

* cited by examiner

TABLETOP DISPLAY DEVICE AND DRIVING METHOD THEREFOR

TECHNICAL FIELD

The present disclosure relates to a tabletop display device and a driving method therefor; and, more particularly, to a tabletop display device for displaying an image on a flat panel display and a driving method therefor.

BACKGROUND

A computer can be used as a cooperative work tool. A tabletop display device having a touch screen on top of a table is useful for cooperative work using a computer.

Tabletop display devices have recently been scaled up so that people using the devices can easily interact with each other during cooperative work.

However, since such a tabletop display device has a large-sized flat panel display, it is difficult for a user who is positioned at one side to touch the entire screen. Therefore, it is required to estimate a user's position and display an interface screen on a region of the flat panel display that is close to the user.

Conventionally, a technique for detecting a user accessing a flat panel display by transmitting and receiving a wireless signal to and from a user's terminal (see, e.g., Korean Patent Application Publication No. 2016-0013313), or a technique for detecting a user accessing a flat panel display by emitting light to the user and receiving the light reflected by the user is used.

However, in the conventional technique, additional hardware to detect user access may be required. Accordingly, manufacturing costs and power consumption of the tabletop display device are increased.

SUMMARY

In view of the above, the present disclosure provides a tabletop display device capable of suppressing increases in manufacturing costs and power consumption thereof by integrating hardware for detecting touch on a flat panel display and hardware for detecting a user's access, and a driving method therefor.

It is to be understood, however, that the object of the present disclosure is not limited to those mentioned above. Other objects not mentioned above will be clearly understood by those skilled in the art from the following description.

In accordance with an aspect of the present disclosure, there is provided a tabletop display device including: a flat panel display configured to display an image; a plurality of light emitting units arranged along a periphery of the flat panel display, each of the light emitting units being configured to emit light toward an inner side and an outer side of the periphery of the flat panel display; a plurality of light receiving units arranged along the periphery of the flat panel display, each of the light receiving units being configured to receive light incident from the outer side of the periphery of the flat panel display and light incident from the inner side of the periphery of the flat panel display; and a control unit configured to detect a user's position based on light that is emitted from at least one of the light emitting units and received from the outer side of the periphery of the flat panel display by at least one of the light receiving units and determine a touch position of the flat panel display based on light emitted from at least one of the light emitting units and received from the inner side of the periphery of the flat panel display by at least one of the light receiving units.

In accordance with another aspect of the present disclosure, there is provided a driving method for a tabletop display device including a flat panel display for displaying a user interface screen, the driving method including: detecting a user's position based on light received from an outer side of a periphery of the flat panel display after the light is emitted toward a direction of the outer side of the periphery of the flat panel display; and detecting, after the user's position is detected, a touch position based on light received from an inner side of the periphery of the flat panel display after the light is emitted toward a direction of the inner side of the periphery of the flat panel display.

In accordance with the aspects of the present disclosure, it is possible to manufacture a tabletop display device in which hardware for detecting the touch of a flat panel display and hardware for detecting a user's access are integrated.

Accordingly, it is possible to reduce manufacturing costs and power consumption of the tabletop display device.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
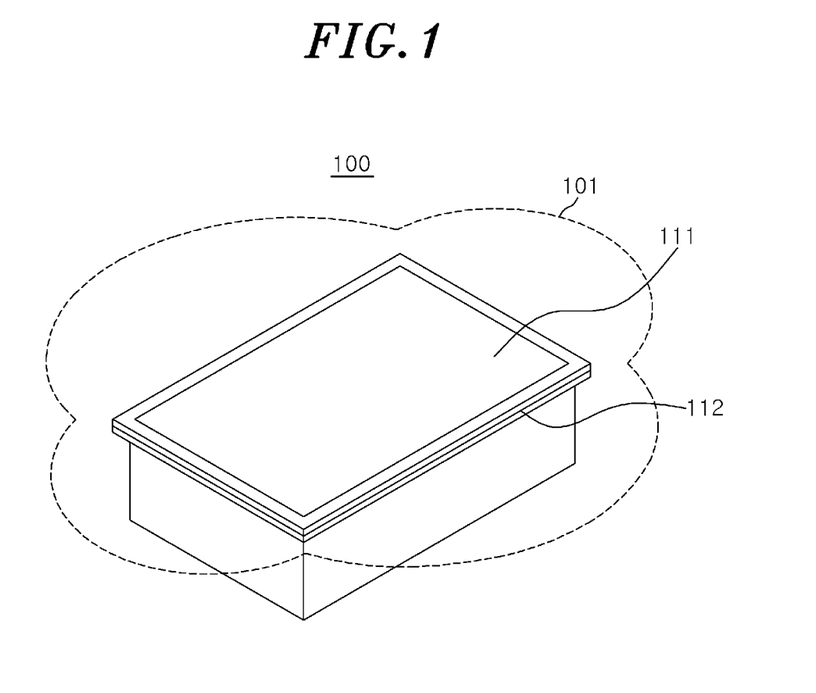
FIG. 1 is an external view of a tabletop display device according to a first embodiment of the present disclosure.
Figure 2:
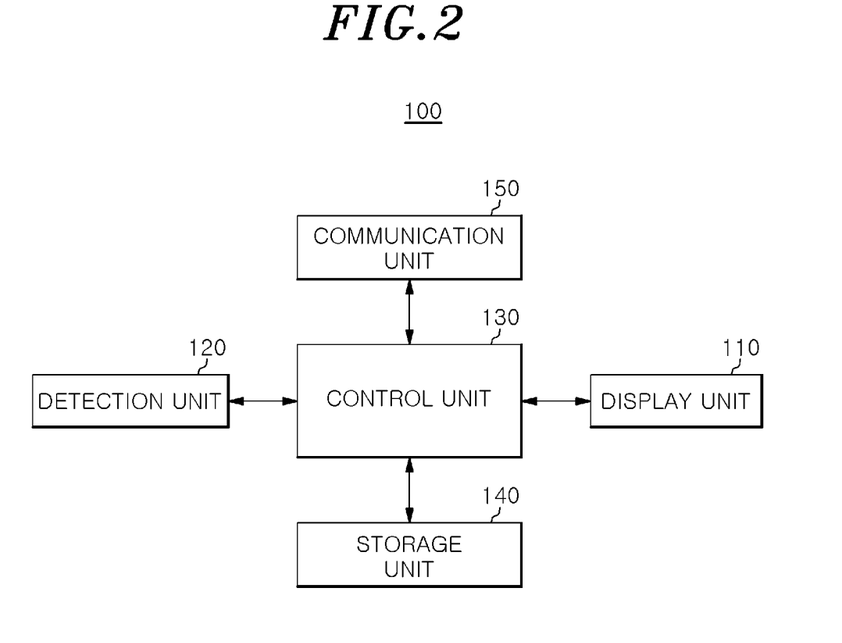
FIG. 2 is a block diagram showing a configuration of the tabletop display device according to the first embodiment of the present disclosure.
Figure 3:
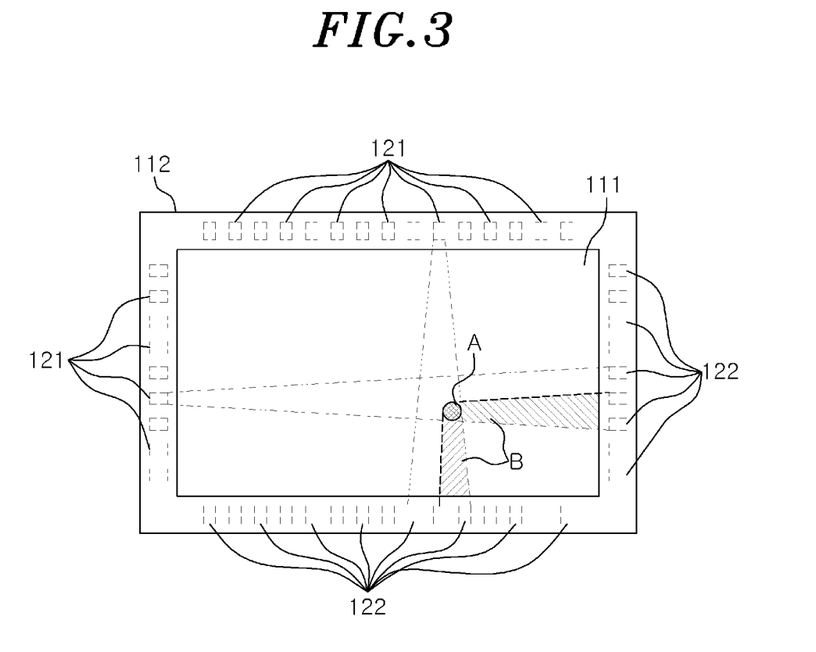
FIG. 3 shows an arrangement of light emitting units and light receiving units in the tabletop display device according to the first embodiment of the present disclosure.
Figure 4:
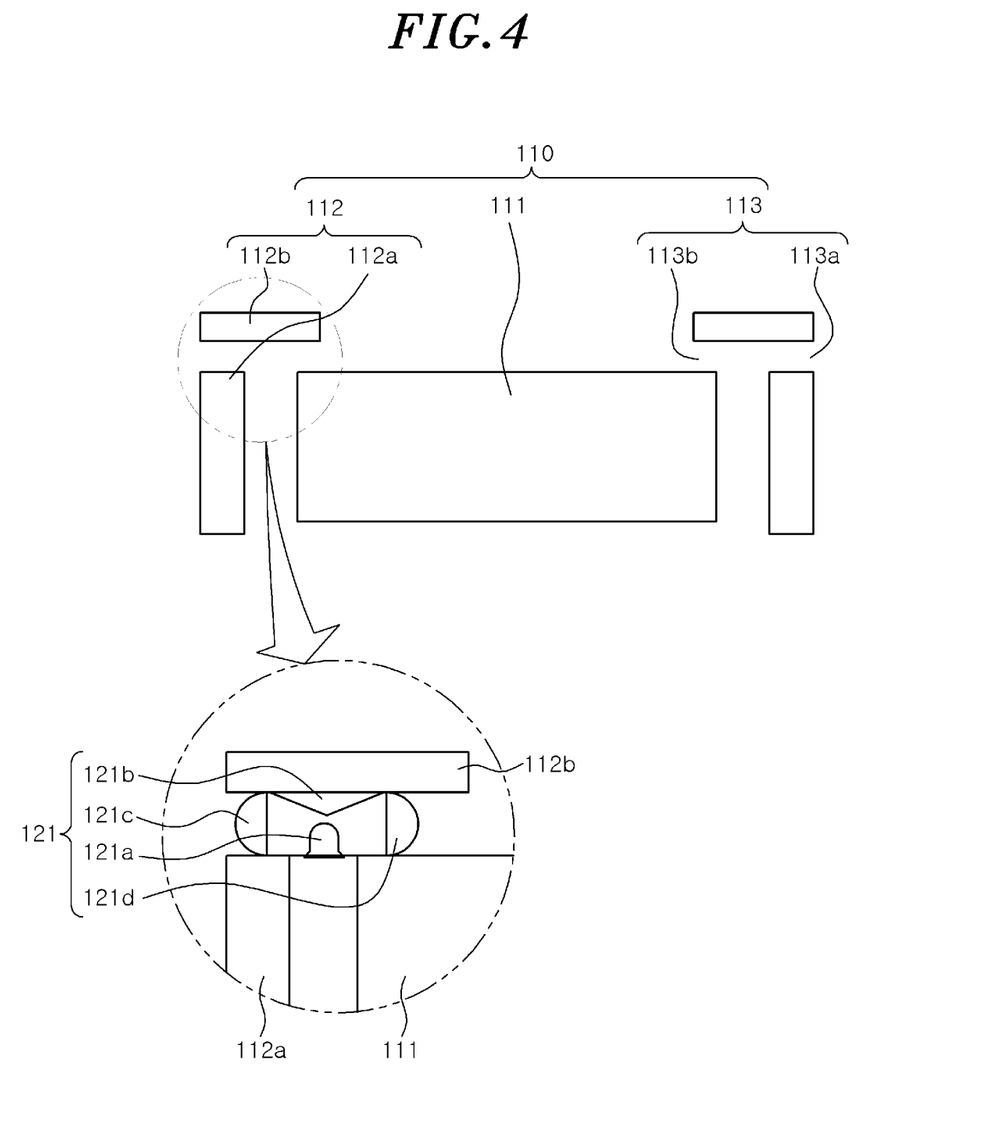
FIG. 4 is a partial vertical cross-sectional view for explaining a structure of a detection unit in the tabletop display device according to the first embodiment of the present disclosure.

FIG. 1 is an external view of a tabletop display device according to a first embodiment of the present disclosure. FIG. 2 is a block diagram showing a configuration of the tabletop display device according to the first embodiment of the present disclosure. FIG. 3 shows an arrangement of light emitting units and light receiving units in the tabletop display device according to the first embodiment of the present disclosure. FIG. 4 is a partial vertical cross-sectional view for explaining a structure of a detection unit in the tabletop display device according to the first embodiment of the present disclosure.

A table top display device 100 according to the first embodiment of the present disclosure includes a display unit 110, a detection unit 120, a control unit 130, a storage unit 140, and a communication unit 150.

The display unit 110 includes a flat panel display 111 configured to display images. The display unit 110 further includes a frame 112 disposed at the vicinity of a periphery of the flat panel display 111 that surrounds the flat panel display 111. The frame 112, while facing the periphery of the flat panel display 111, includes a frame wall portion 112a disposed to surround the periphery of the flat panel display 111 with a gap between the frame wall portion 112a and the periphery of the flat panel display 111. The frame 112 further includes a frame cover portion 112b supported by the frame wall portion 112a and extending by a predetermined distance in a direction parallel to the flat panel display 111 while an open path 113 through which light from a light emitting unit 121 passes is provided between the frame wall portion 112a and the frame cover portion 112b. The open path 113 includes a first open path 113a through which light passes in a direction toward the outer side of the periphery of the flat panel display 111, and a second open path 113b through which light passes in a direction toward the inner side of the periphery of the flat panel display 111. For example, the flat panel display 111 can be implemented by a display device such as a liquid crystal display (LCD) panel, a light emitting diode (LED) panel, or the like. A protective cover (not shown) can be provided on top of the flat panel display 111. An insulating layer (not shown) can be provided along a peripheral edge of the flat panel display 111 between the flat panel display 111 and the protective cover.

The detection unit 120 is configured to detect user access in an access detection area 101 defined in an outer region of the flat panel display 111 and also detect a user's touch on the flat panel display 111. The detection unit 120 provides the obtained information (i.e., access information and touch information) to the control unit 130. The detection unit 120 includes a plurality of light emitting units 121, which are arranged along the periphery of the flat panel display 111 and configured to emit light toward the inner side and the outer side of the periphery of the flat panel display 111 simultaneously. The detection unit 120 further includes a plurality of light receiving units 122, which are arranged along the periphery of the flat panel display 111 and configured to receive light incident from the inner side and the outer side of the periphery of the flat panel display 111. The light emitting units 121 and the light receiving units 122 can be arranged alternately along the periphery of the flat panel display 111 to surround the flat panel display 111.

Each of the light emitting units 121 includes a light emitting diode 121a that is supported by the frame wall portion 112a and/or the flat panel display 111 to emit light. The light emitting diode 121a may be disposed between the frame wall portion 112a and the flat panel display 111. Each of the light emitting units 121 further includes a reflection unit 121b disposed on a lower surface of the frame cover portion 112b (i.e., above the light emitting diode 121a) and configured to reflect the light emitted from the light emitting diode 121a to the inner side and the outer side of the periphery of the flat panel display 111. Each of the light emitting units 121 further includes a pair of lenses 121c and 121d for distributing the light from the light emitting diode 121a and/or the light reflected by the reflection unit 121b to the inner side and the outer side of the periphery of the flat panel display 111. Here, each of the light receiving units 122 receives light that is reflected by a user placed in an access detection area 101 after being emitted toward the direction (first direction) of the outer side of the periphery of the flat panel display 111 by the reflection unit 121b. Further, each of the light receiving units 122 receives light that is reflected by the reflection unit 121b and emitted toward the direction (second direction) of the inner side of the periphery of the flat panel display 111. Here, the access detection area 101 can be determined based on an effective light emitting distance of each light emitting unit 121 and light receiving performance of each light receiving unit 122. For example, the light emitting unit 121 can be implemented by an infrared light emitting diode, and the light receiving unit 122 can be implemented by an infrared light receiving diode. The reflection unit 121b can be implemented by a reflector. The lenses 121c and 121d can be implemented by light distribution lenses. Alternatively, the light emitting diode 121a may emit light in the directions toward the inner side and the outer side of the periphery of the flat panel display 111 without passing through the lenses 121c and 121d or the reflection unit 121b.

The control unit 130 is configured to determine a user's position in the access detection area 101 based on the access information provided by the detection unit 120 and determine a user's touch position based on the touch information on the flat panel display 111 provided by the detection unit 120. The control unit 130 is further configured to control the display unit 110 to display the information (user interface screen) on a set position of the flat panel display 111 based on the determined access position and the determined touch position.

In the case of arranging the light emitting units 121 and the light receiving units 122 alternately to emit or receive light in parallel with each other, the control unit 130 may initially drive only a part of the multiple pairs of the light emitting units 121 and the light receiving units 122 when there is no user touching the flat panel display 111. Then, when light is received by at least one of the light receiving units 122, the control unit 130 drives the light emitting units 121 sequentially or entirely. The user's access position can be determined by the control unit 130 by detecting which light receiving unit 122 has received the light among the light receiving units 122. Here, if light is received by two or more light receiving units 122, the control unit 130 compares the amount of received light of each light receiving unit 122 that received the light and determines the one that has received the largest amount of light. The position of the corresponding light receiving unit 122 can be determined as the user's access position. Accordingly, power consumption can be reduced compared to the case of initially driving all of the light emitting units 121 and the light receiving units 122. For example, the control unit 130 can be implemented by a processor such as a central processing unit (CPU) or the like.

The storage unit 140 is configured to store an operation system and various application programs for driving the tabletop display device 100. For example, the storage unit 140 may be implemented by a memory device such as an Electrically Erasable Programmable Read-Only Memory (EEPROM) or the like.

The communication unit 150 is configured to provide, to the control unit 130, a result of a short-distance communication with a user's terminal or a terminal disposed at a predetermined position on the flat panel display 111. For example, the communication unit 150 may be implemented by a short-distance communication module such as an NFC (Near Field Communication) module or the like.

Figure 5:
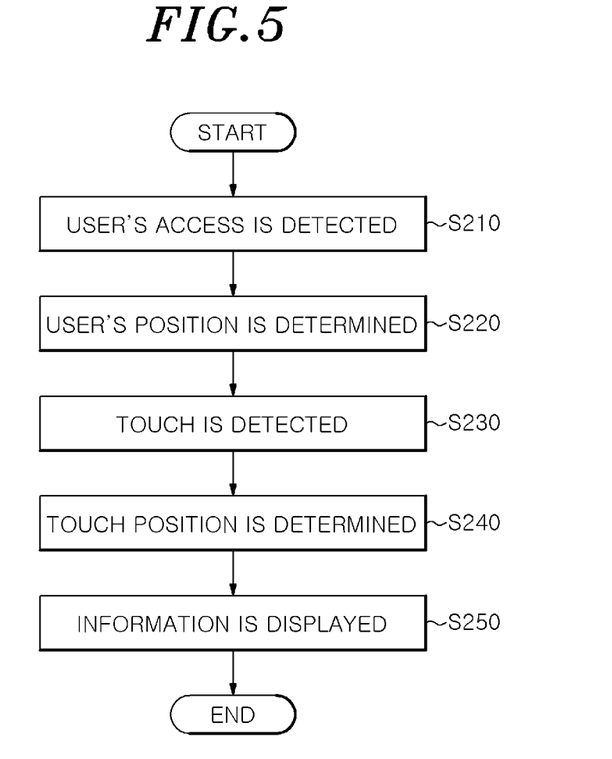
FIG. 5 is a flowchart for explaining a driving method for the tabletop display device according to the first embodiment of the present disclosure.

FIG. 5 is a flowchart for explaining a driving method for the tabletop display device having the flat panel display for displaying the user interface screen according to the first embodiment of the present disclosure.

Referring to FIG. 5, the driving method for the tabletop display device includes steps of emitting light toward the inner side and the outer side of the periphery of the flat panel display simultaneously and detecting a user's access based on the light received from the outer side of the periphery of the flat panel display to determine a user's position (steps S210 and S220). In these steps, a user's access can be detected when light is emitted toward the first direction (from the light emitting units to the outer side of the periphery) from the multiple light emitting units that are spaced apart from each other along the periphery of the flat panel display, and at least one of the multiple light receiving units receives light reflected by the user placed in the access detection area set in the outer region of the flat panel display. Then, the user's access position can be determined by detecting which light receiving unit received the light among the multiple light receiving units.

For example, in the case of multiple light emitting units and multiple light receiving units arranged alternately to emit or receive light in parallel with each other, initially, only a part of the multiple pairs of the light emitting units and the light receiving units are driven. Then, when light is received by any one of the light receiving units, all of the multiple light emitting units are sequentially or entirely driven. Then, the user's position can be determined by detecting which light receiving unit has received the light among the multiple light receiving units.

Further, the driving method for the tabletop display device includes steps of emitting light to the inner side and the outer side of the periphery of the flat panel display simultaneously in response to the detection of the user's position, detecting the touch and determining the touch position based on the light received from the inner side of the periphery of the flat panel display (steps S230 and S240). In these steps, the user's touch on the flat panel display can be detected when at least one of the multiple light receiving units receives the light reflected toward the second direction (from the light emitting units to the inner side of the periphery) after being emitted from at least one of the multiple light emitting units. Then, the user's touch position can be determined by detecting which light receiving unit has received a touch signal on the flat panel display and which light receiving unit has not received the touch signal among the multiple light receiving units.

For example, in the case where the multiple light emitting units and the multiple light receiving units are arranged alternately to emit or receive light in parallel with each other, when a user touches a predetermined position on the flat panel display 111, the light is blocked and a shadow is generated. Thus, among the light receiving units that had been receiving light before the user touches the predetermined position on the flat panel display 111, several light receiving units do not receive light after the user's touch at the width sides and the length sides of the flat panel display. Then, the intersection position of the light receiving paths of the several light receiving units, which do not receive the light and are disposed at the width sides and the length sides of the flat panel display, can be determined as the touch position.

Furthermore, the driving method for the tabletop display device includes: displaying information (user interface screen) on the flat panel display based on the detected user's position and the determined touch position (step S250). Here, on the assumption that the user is located at the detected user's access position, it is possible to display the user interface screen, a specific application program execution screen, or the like in a region in the entire region of the flat panel display that is close to the detected access position.

Hereinafter, the driving method for the tabletop display device according to the first embodiment of the present disclosure will be described in detail with reference to FIGS. 1 to 5.

First, the control unit 130 initially drives a part of the multiple pairs of the light emitting units 121 and the light receiving units 122 constituting the detection unit 120. Then, the light is reflected and distributed in the first direction and the second direction by the reflection unit 121b. The light reflected in the first direction is emitted to the outer region of the frame 112, which is the outer side of the periphery of the flat panel display 111, through the first open path 113a. The light reflected in the second direction is emitted to the inner side of the periphery of the flat panel display 111 through the second open path 113b.

At this time, if the user enters the access detection area 101 set in the outer region of the flat panel display 111 and the frame 112, the light is reflected by the user and received by any one of the light receiving units 122. The reception signal is transmitted to the control unit 130 (step S210).

Then, the control unit 130 drives the light emitting units 121 sequentially or entirely and detects which light receiving unit 122 has received the light among the light emitting units 121. A user's access position can be determined based on the detection results (step S220). In this case, if the light is received by two or more light receiving units 122, the control unit 130 compares the amount of light received by each of two or more light receiving units 122 and detects the one that has received the largest amount of light. The position of the light receiving unit 122 that has received the largest amount of light can be determined as the access position. Here, instead of driving all of the light emitting units 121 from the start, the several pairs of the light emitting units 121 and the light receiving units 122 may be initially driven and, then, the light emitting units 121 and the light receiving units 122 may be driven sequentially. This is effective to minimize the increase in power consumption. The several light emitting units 121 that are initially driven to emit light to detect the user's position may include at least one light emitting unit 121 that is not driven. Further, the several light emitting units 121 initially driven may be driven sequentially.

When the user's position is detected, the entire light emitting units 121 are driven. Then, when the user touches the flat panel display 111, the light reflected and distributed in the second direction after being emitted from at least one of the entire light emitting units 121 is blocked by a user's finger. Accordingly, the light is not detected by at least two light receiving units 122 arranged at different sides of the flat panel display 111. In this case, the control unit 130 detects and determines that the flat panel display 111 is touched by the user (step S230). Alternatively, when the user's position is detected in step S220, it is possible to detect a user's touch and a touch position by driving only light emitting units 121 positioned within a predetermined distance from the light emitting unit 121 from which the user is detected (e.g., a distance ranging from the user's position to a position that can be accessed by a user's arm).

Then, the control unit 130 determines the touch position by detecting which light receiving unit 122 has received a touch signal of the flat panel display 111 and which light receiving unit 122 has not received the touch signal among the plurality of light receiving units 122. For example, referring to FIG. 3, when a user touches a position A on the flat panel display 111, the light is blocked by the user and a shadow B is generated. Thus, among the light receiving units 122 that had been receiving light before the user touched position A on the flat panel display 111, several light receiving units do not receive light after the user's touch at the width sides and the length sides of the flat panel display 111. The control unit 130 determines, as the touch position, the intersection position of the light receiving paths of the several light receiving units, which do not receive the light and are disposed at the width sides and the length sides of the flat panel display 111 (step S240).

Next, the control unit 130 controls the display unit 110 to display the desired information at a position on the flat panel display 111 set based on the determined access position and the determined touch position. In other words, the control unit 130 determines that the user is located at the access position determined in step S220 and controls the display unit 110 to display a user interface screen, a specific application program execution screen or the like in that corresponds to the touch position determined in step S240, in a region in the entire region of that flat panel display 111 that is close to the determined access position (step S250).

Figure 6:
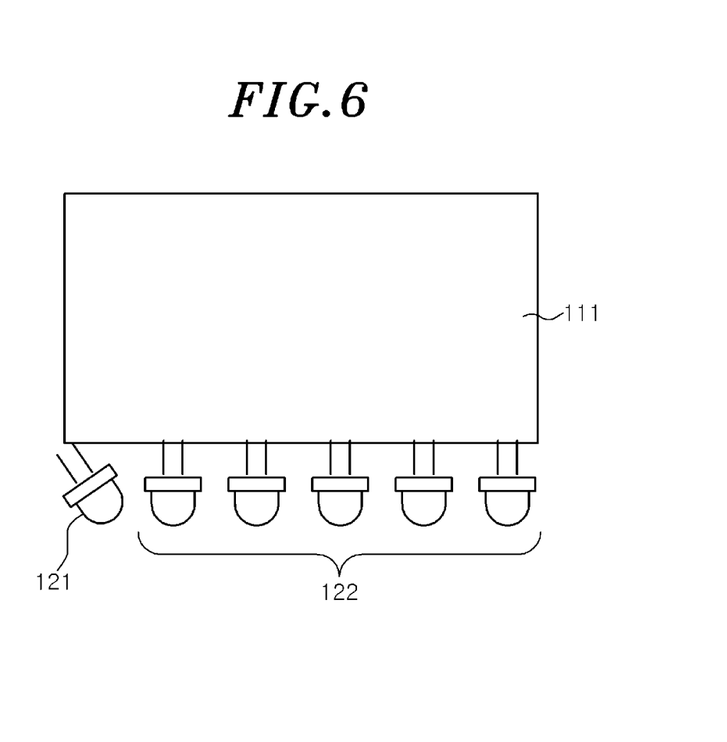
FIG. 6 shows an arrangement of light emitting units and light receiving units in a tabletop display device according to a second embodiment of the present disclosure.

FIG. 6 shows an arrangement of light emitting units and light receiving units in a tabletop display device according to a second embodiment of the present disclosure.

Specifically, FIG. 6 shows one of four sides of the rectangular flat panel display 111 in the case of arranging the light emitting units 121 and the light receiving units 122 along the periphery of the flat panel display 111. In this example, one light emitting unit 121 is provided, and an N-number (N being a natural number greater than or equal to 2) of light receiving units 122 are arranged side by side to receive light reflected by a user placed in the access detection area 101 that was emitted from the one light emitting unit 121. For example, one light emitting unit 121 is arranged to be inclined at a predetermined angle θ with respect to a direction perpendicular to the side of the flat panel display 111 to emit light in an oblique direction, and the N-number of light receiving units 122 are arranged side by side in such a way that the light reflected by the user in the access detection area 101 is received by at least one of the N-number of light receiving units 122.

In step S210, the control unit 130 drives some of the N-number of light receiving units 122 and one light emitting unit 121 and detects a user's access based on the light received by the driven light receiving units 122. In step S220, the control unit 130 drives the N-number of light receiving units 122 and determines a user's access position by detecting which light receiving unit 122 has received the light among the N-number of light receiving units 122. At this time, if the light is received by a plurality of light receiving units 122, the user's position can be determined based on the amount of received light and the inclination angle θ of the light emitting unit 121.

Figure 7:
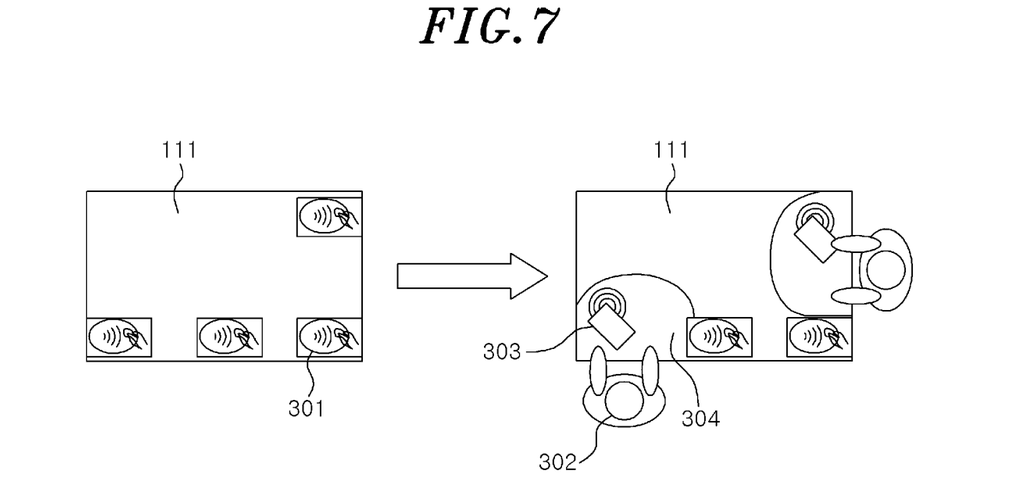
FIG. 7 is a conceptual diagram for explaining a driving method for a tabletop display device according to a third embodiment of the present disclosure.

FIG. 7 is a conceptual diagram for explaining a driving method for a tabletop display device according to a third embodiment of the present disclosure.

In this embodiment, the user's access and the user's access position can be detected through the communication unit 150. The display unit 110 includes a plurality of antenna regions 301 where short-distance communication antennas are installed. When a user 302 brings a terminal 303 with an activated short-distance communication function near the antenna region 301, the communication unit 150 transmits the user's access to the control unit 130. The control unit 130 controls the display unit 110 to display a user interface screen 304 near the detected antenna region 301.

Figure 8:
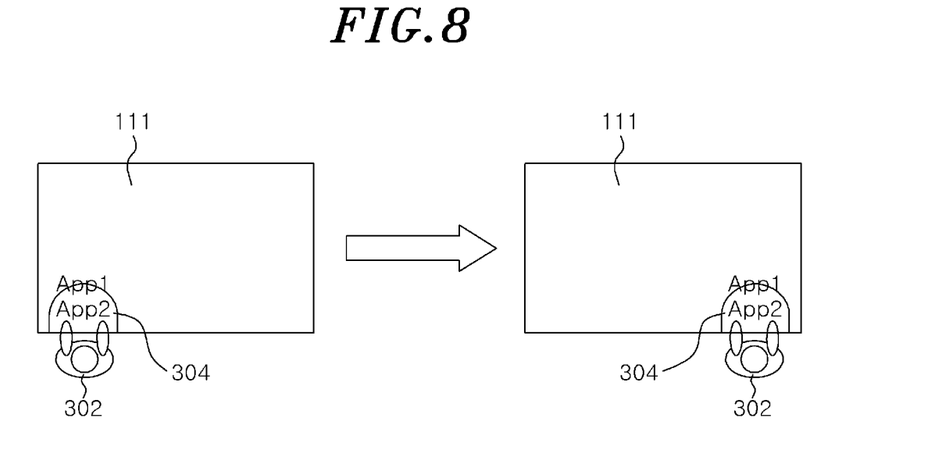
FIG. 8 is a conceptual diagram for explaining a driving method for a tabletop display device according to a fourth embodiment of the present disclosure.

FIG. 8 is a conceptual diagram for explaining a driving method for a tabletop display device according to a fourth embodiment of the present disclosure.

In this embodiment, when a change in the position of the user 302 has been detected by detecting the user's access and the user's position by the detection unit 120 as described in the first embodiment or by detecting the user's access and the user's position by the communication unit 150 as described in the third embodiment, the control unit 130 controls the display unit 110 to display the user interface screen 304 in the changed position in response to the user's movement.

Figure 9:
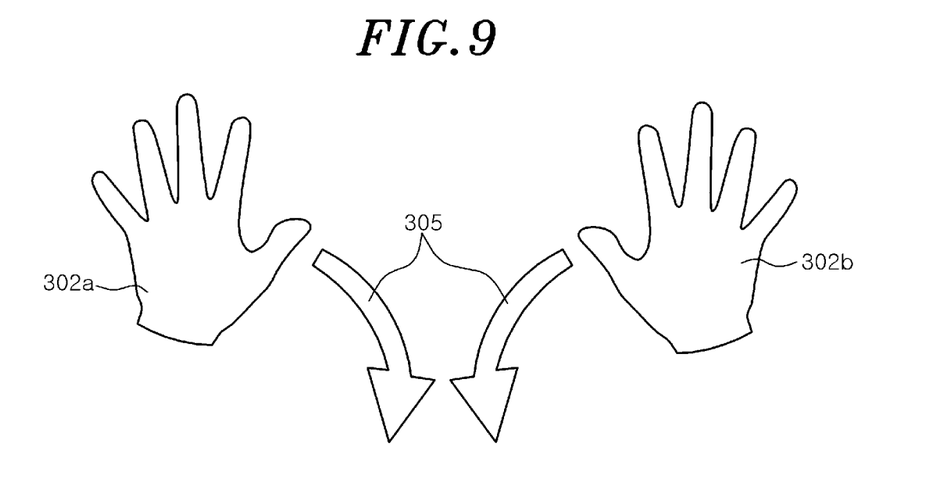
FIG. 9 is a conceptual diagram of a gesture for explaining a driving method for a tabletop display device according to a fifth embodiment of the present disclosure.
Figure 10:
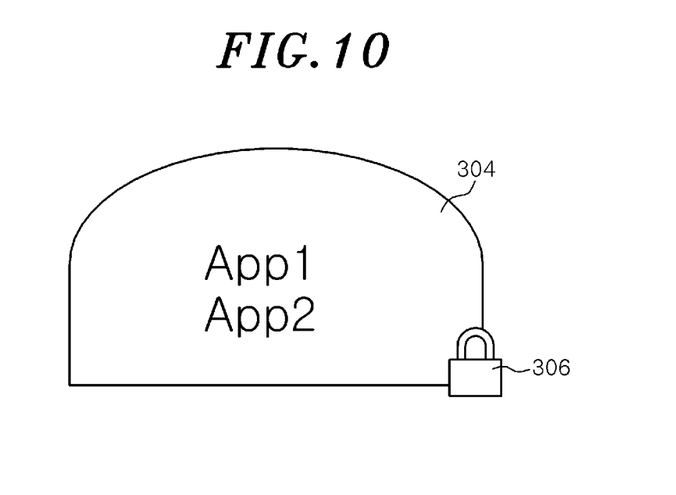
FIG. 10 shows an example of a lock screen for explaining the driving method for the tabletop display device according to the fifth embodiment of the present disclosure.

FIG. 9 is a conceptual diagram of a gesture for explaining a driving method for a tabletop display device according to a fifth embodiment of the present disclosure. FIG. 10 shows an example of a lock screen for explaining the driving method for the tabletop display device according to the fifth embodiment of the present disclosure.

In accordance with the fifth embodiment, when it is detected, through the repeated execution of steps S230 and S240, that both of the user's hands 302a and 302b are making a touch gesture 305 of sweeping both hands 302a and 302b toward the periphery of the flat panel display 111, the control 130 locks the user interface screen 304 and controls the display unit 110 to display the user interface screen 304 with the lock screen 306.

Figure 11:
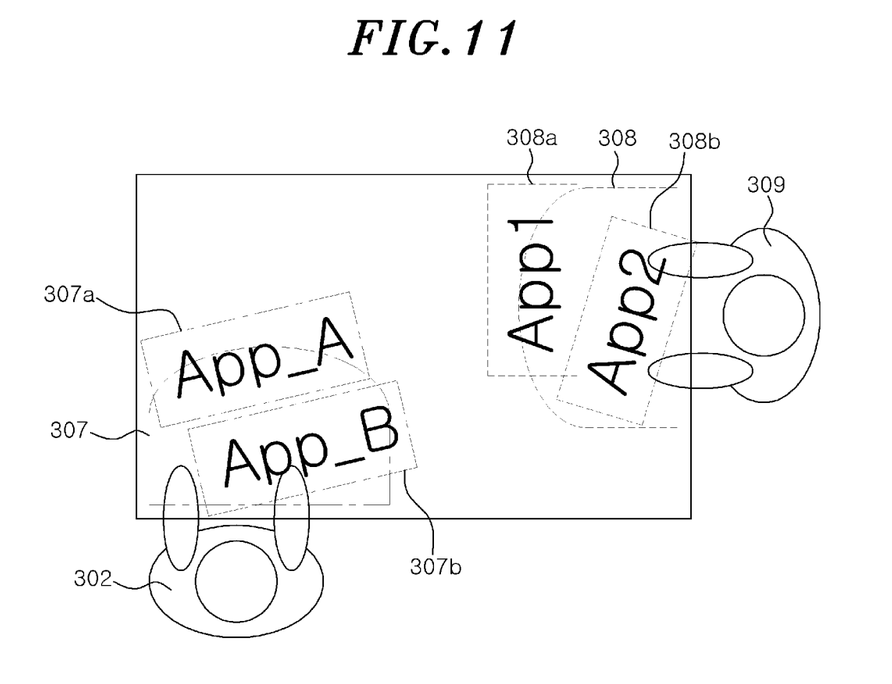
FIGS. 11 and 12 are conceptual diagrams for explaining a driving method of a tabletop display device according to a sixth embodiment of the present disclosure.
Figure 12:
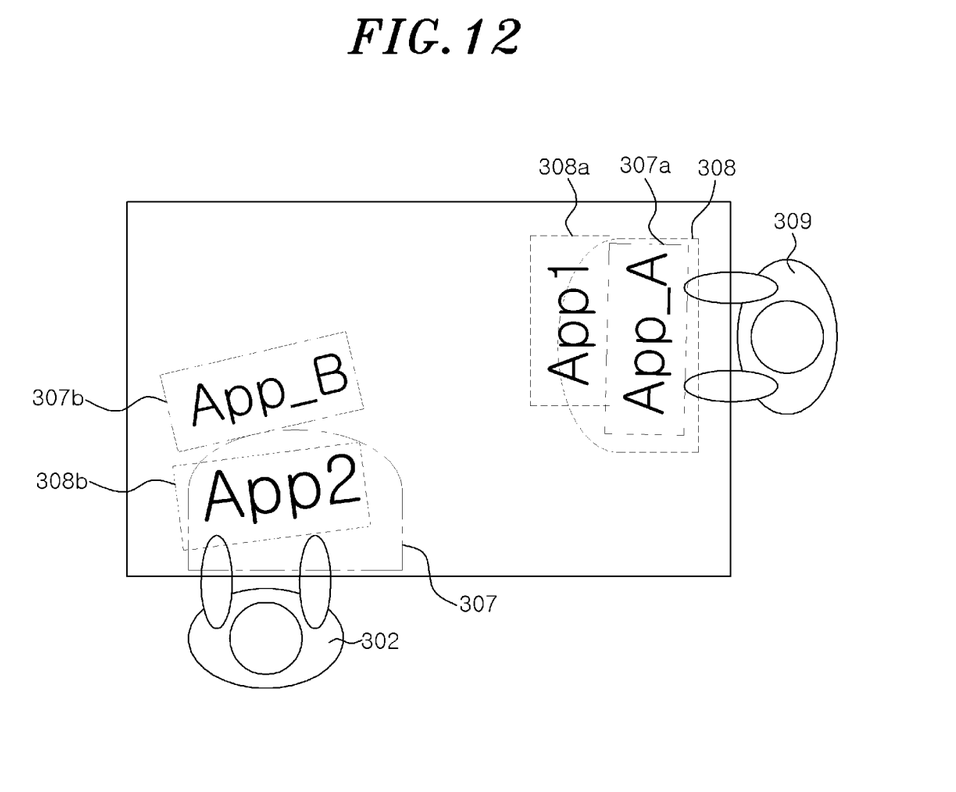

FIGS. 11 and 12 are conceptual diagrams for explaining a driving method of a tabletop display device according to a sixth embodiment of the present disclosure.

In this embodiment, positions of multiple users 302 and 309 may be determined by detecting a user's access and a user's position by the detection unit 120 as described in the first embodiment or by detecting a user's access and a user's position by the communication unit 150 as described in the third embodiment. In this case, the control unit 130 controls the display unit 110 such that a first user interface screen 307 of the first user 302 and a second user interface screen 308 of the second user 309 are distinguishably displayed. Further, the control unit 130 controls the display unit 110 such that application program screens 307a and 307b displayed in the first user interface screen 307 and application program screen 308*a* and 308*b* displayed in the second user interface screen 308 are distinguishably displayed. For example, the control unit 130 controls the display unit 110 to display the outlines of the user interface screens 307 and 308 and the application program screens 307*a*, 307*b*, 308*a*, and 308*b* in different shapes or colors.

Further, when the application program screens 307*a* and 307*b* are overlapped in the first user interface screen 307 or when the application program screens 308*a* and 308*b* are overlapped in the second user interface screen 308, the control unit 130 controls the display unit 110 to automatically adjust the sizes of the application program screens 307*a*, 307*b*, 308*a* and 308*b* to display the application program screens in each of the first user interface screen 307 and the second user interface screen 208 without overlapping each other.

In accordance with the sixth embodiment, since the application program screens 307*a* and 307*b* of the first user 302 and the application program screens 308*a* and 308*b* of the second user 309 are distinguishably displayed, it is possible to easily distinguish a user who has executed an application program screen even when the application program screen 307*a* executed by the first user 302 is moved to the second user interface screen 308 and/or the application program screen 308*a* executed by the second user 309 is moved to the first user interface screen 307 as shown in FIG. 12.

Further, when the application program screens 307*a* and 307*b* of the first user 302 and the application program screens 308*a* and 308*b* of the second user 309 are mixedly displayed as shown in FIG. 12, it is possible to allow only the user who initially executed the program to terminate the corresponding application program screens. For example, the application program screens 307*a* and 307*b* can be terminated when they are displayed on the first user screen 307. On the other hand, the application program screens 307*a* and 307*b* cannot be terminated when they are displayed on the second user screen 308. In the same manner, the application program screens 308*a* and 308*b* can be terminated when they are displayed on the second user screen 308. On the other hand, the application program screens 308*a* and 308*b* cannot be terminated when they are displayed on the first user screen 307.

As described above, in accordance with the embodiments of the present disclosure, hardware for detecting touch on a flat panel display and hardware for detecting a user's access of the flat panel display can be integrally designed and manufactured.

Accordingly, it is possible to minimize the increase in manufacturing cost and power consumption of the tabletop display device.

The combinations of the respective sequences of a flow diagram attached herein may be carried out by computer program instructions. Since the computer program instructions may be executed by the processor of a general purpose computer, a special purpose computer, or other programmable data processing apparatus, the instructions, executed by the processor of the computer or other programmable data processing apparatus, create means for performing functions described in the respective sequences of the sequence diagram. The computer program instructions, in order to implement functions in a specific manner, may be stored in a computer-readable storage medium or a computer-useable storage medium for other programmable data processing apparatus, and the instructions stored in the computer-readable storage medium or the computer-useable storage medium may produce manufacturing items that include means for instructions to perform the functions described in the respective sequences of the sequence diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logic function(s). In some alternative embodiments, it is noted that the functions described in the sequences may be run out of order. For example, two consecutive sequences may be executed simultaneously or in reverse order according to the particular function.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

One embodiment of the present disclosure can be utilized in constituting hardware for detecting a user's access in a tabletop display device including a flat panel display for a large-sized tabletop interface.

What is claimed is:

1. A tabletop display device comprising:
a flat panel display configured to display an image;
a plurality of light emitting units arranged along a periphery of the flat panel display, each of the light emitting units being configured to emit light toward an inner side and an outer side of the periphery of the flat panel display;
a plurality of light receiving units arranged along the periphery of the flat panel display, each of the plurality of light receiving units being configured to receive light incident from the outer side of the periphery of the flat panel display and light incident from the inner side of the periphery of the flat panel display; and
a control unit configured to
detect a user's position based on the light emitted from at least one of the plurality of light emitting units and received from the outer side of the periphery of the flat panel display by at least one of the plurality of light receiving units, the outer side being defined as an outside of the periphery of the flat panel display, when seen in a top view of the flat panel display, and
determine a touch position of the flat panel display based on the light emitted from at least one of the plurality of light emitting units and received from the inner side of the periphery of the flat panel display by at least one of the plurality of light receiving units, the inner side being defined as an inside of the periphery of the flat panel display, when seen in the top view of the flat panel display,
wherein each of the plurality of light emitting units includes:
a light emitting diode configured to emit light; and
a reflection unit configured to reflect the light emitted from the light emitting diode to the inner side and the outer side of the periphery of the flat panel display,
wherein the light emitted toward the outer side of the periphery of the flat display is light emitted parallel to the flat panel display, and
wherein the light emitted toward the inner side of the periphery of the flat display is light emitted parallel to the flat panel display.

2. The tabletop display device of claim 1, wherein each of the light emitting units further includes:
a pair of lenses configured to distribute the light reflected by the reflection unit to the inner side and the outer side of the periphery of the flat panel display.

3. The tabletop display device of claim 1, further comprising:
a frame,
wherein the frame includes:
a frame wall portion disposed to surround the periphery of the flat panel display while facing the periphery of the flat panel display with a gap therebetween; and
a frame cover portion supported by the frame wall portion and extending by a predetermined distance in a direction parallel to the flat panel display,
wherein an open path through which light emitted from the light emitting units pass is provided between the frame wall portion and the frame cover portion.

4. The tabletop display device of claim 3, wherein the reflection unit is provided at the frame cover portion.

5. The tabletop display device of claim 4, wherein each of the light emitting units further includes:
a pair of lenses provided in the open path to distribute the light emitted from the light emitting diode to the inner side and the outer side of the periphery of the flat panel display.

6. The tabletop display device of claim 1, wherein the control unit is further configured to display a user interface screen on the flat panel display based on the user's position and the touch position.

7. A driving method for a tabletop display device including a flat panel display for displaying a user interface screen, comprising:
detecting a user's position based on light received from an outer side of a periphery of the flat panel display after the light is emitted toward a direction of the outer side of the periphery of the flat panel display, the outer side being defined as an outside of the periphery of the flat panel display when seen in a top view of the flat panel display; and
detecting, after the user's position is detected, a touch position based on light received from an inner side of the periphery of the flat panel display after the light is emitted toward a direction of the inner side of the periphery of the flat panel display, the inner side being defined as an inside of the periphery of the flat panel display when seen in the top view of the flat panel display,
wherein the flat panel display includes a plurality of light emitting units and a plurality of light receiving units that are arranged along the periphery of the flat panel display,
wherein each of the plurality of light emitting units includes:
a light emitting diode configured to emit light; and
a reflection unit configured to reflect the light emitted from the light emitting diode to the inner side and the outer side of the periphery of the flat panel display,
wherein the light emitted toward the outer side of the periphery of the flat display is light emitted parallel to the flat panel display, and
wherein the light emitted toward the inner side of the periphery of the flat display is light emitted parallel to the flat panel display.

8. The driving method of claim 7, further comprising:
displaying the user interface screen on the flat panel display based on the user's position and the touch position.

9. The driving method of claim 7, wherein said detecting the user's position includes determining a presence of a user by driving a part of the light emitting units.

10. The driving method of claim 9, wherein said detecting the user's position further includes:
detecting, when it is determined by driving the part of the light emitting units that the user is present, the user's position by driving those of the light emitting units that are positioned within a predetermined distance from the light emitting unit from which the user is detected.

11. The driving method of claim 7, wherein in said detecting the touch position, the touch position is detected by driving those of the light emitting units positioned within a predetermined distance from the detected user's position among the plurality of light emitting units.

* * * * *